Feb. 8, 1966 G. BRUST 3,234,513

CHARACTER RECOGNITION APPARATUS

Filed Aug. 10, 1961 8 Sheets-Sheet 1

INVENTOR
GERHARD BRUST

BY Robert Lieber

ATTORNEY

INVENTOR
GERHARD BRUST

BY Robert Lieber

ATTORNEY

INVENTOR
GERHARD BRUST

BY Robert Lieber

ATTORNEY

CHARACTER RECOGNITION APPARATUS
Filed Aug. 10, 1961 8 Sheets-Sheet 4
Fig.3
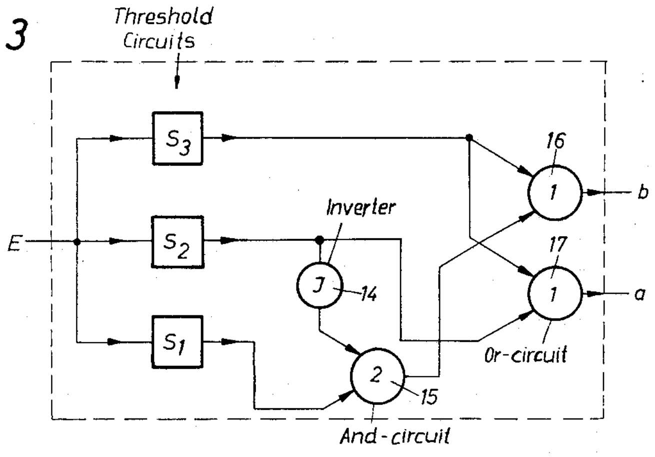
Fig.4
| Input voltage range | Conditions of Threshold circuit outputs | | | state of a and b | |
|---|---|---|---|---|---|
| | $S_1$ | $S_2$ | $S_3$ | a | b |
| 0 ÷ 0,25 | 0 | 0 | 0 | 0 | 0 |
| 0,25 ÷ 0,5 | 1 | 0 | 0 | 0 | 1 |
| 0,5 ÷ 0,75 | 1 | 1 | 0 | 1 | 0 |
| 0,75 ÷ 1 | 1 | 1 | 1 | 1 | 1 |
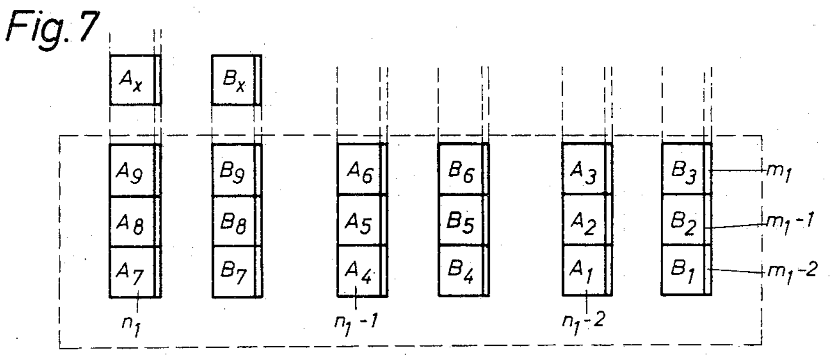
Fig.7
INVENTOR
GERHARD BRUST
BY Robert T Lieber
ATTORNEY Feb. 8, 1966 G. BRUST 3,234,513

CHARACTER RECOGNITION APPARATUS

Filed Aug. 10, 1961 8 Sheets-Sheet 5

INVENTOR
GERHARD BRUST

BY Robert Lieber

ATTORNEY

Feb. 8, 1966 G. BRUST 3,234,513

CHARACTER RECOGNITION APPARATUS

Filed Aug. 10, 1961 8 Sheets-Sheet 6

INVENTOR
GERHARD BRUST

BY Robert Lieber

ATTORNEY

INVENTOR
GERHARD BRUST

BY Robert Lieber

ATTORNEY

CHARACTER RECOGNITION APPARATUS

Filed Aug. 10, 1961

INVENTOR
GERHARD BRUST

BY Robert Lieber

ATTORNEY

United States Patent Office 3,234,513

Patented Feb. 8, 1966

3,234,513
CHARACTER RECOGNITION APPARATUS

Gerhard Brust, Poppenweiler, Kreis Ludwigsburg, Germany, assignor to International Standard Electric Corporation, New York, N.Y., a corporation of Delaware Filed Aug. 10, 1961, Ser. No. 130,550
Claims priority, application Germany, Aug. 17, 1960, St 16,812
6 Claims. (Cl. 340—146.3)

Figure 1A:
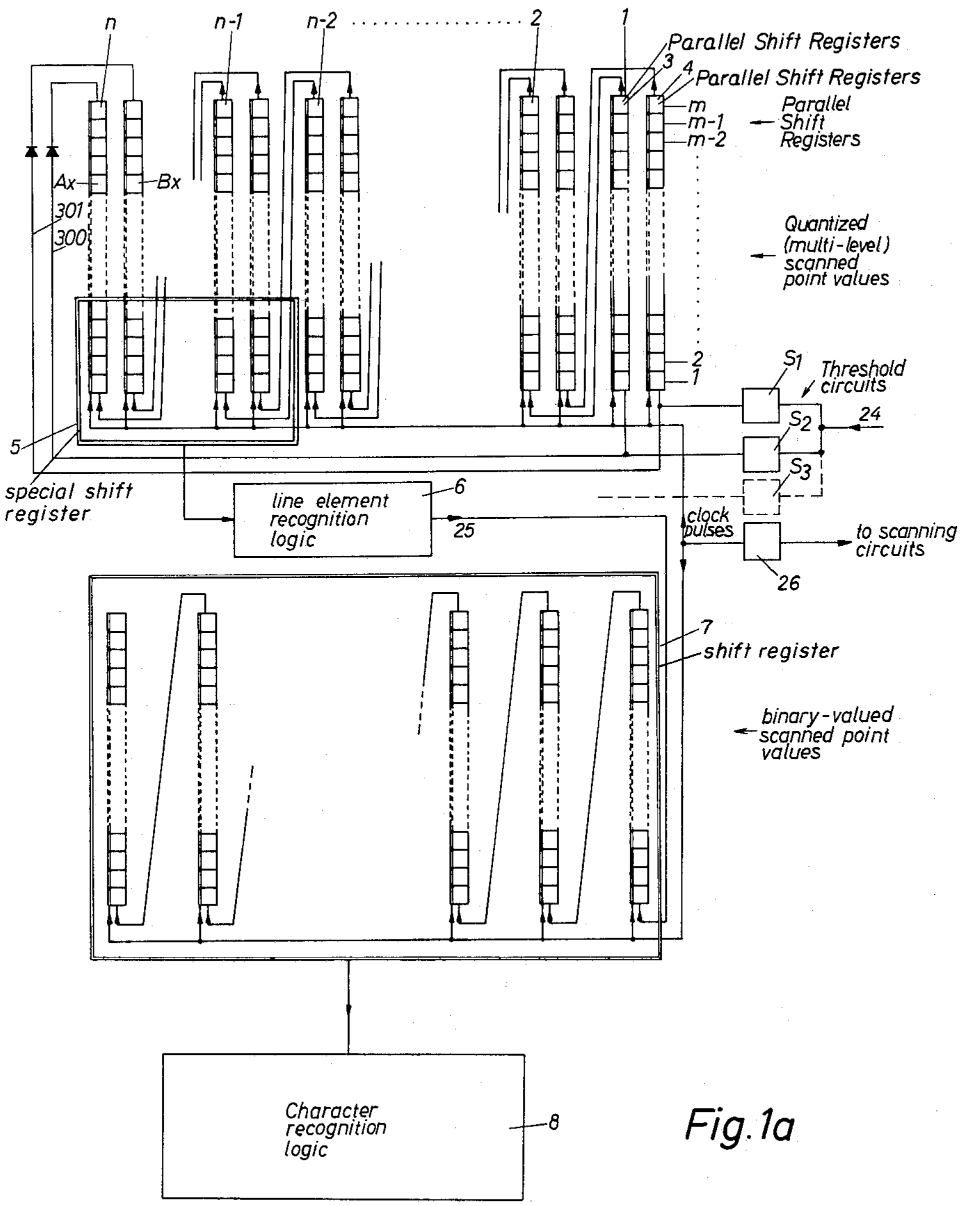

The invention relates to an automatic character-recognition circuit. In known arrangements or methods of this kind, in most cases the character is scanned in a raster-spotwise manner or fully in parallel, and the information obtained from the scanning operation is applied to a storage device to which the recognition circuit is connected. In designing an automatic reading analyser operating on this principle, the selection of a suitable scanning raster for effecting accurate recognition is a particular problem, because the costs increase considerably with the number of scanned raster elements and, consequently, with the storage capacity which is dependent thereon.

The division of a scanning raster depends on the multiplicity of shapes and patterns, as well as on the possible character blurring and mutilation to be expected. The cost of scanning and storing a character can be reduced by using a coarse raster, but on the other hand, distinguishing features of the characters may easily be overlooked in this way, rendering proper recognition difficult, and, in extreme cases, even impossible. However, the expenditure increases considerably if too fine a raster division is employed, and the thus obtained information partly consists of insubstantial or unimportant details which must then also be processed or evaluated in the course of recognition. For example, registration of the smallest blurred element or mutilation, as well as knowledge about the shape of an existing fuzzy edge of a character, is of no interest and, therefore, unnecessary. Also selecting the raster scan points most carefully, and using conventional methods and arrangements for character recognition, it is unavoidable that some fuzzy edges and disturbed individual elements will be scanned together with the undisturbed elements of the actual character.

The present invention relates to a circuit arrangement for automatic character-recognition. According to this invention, characters are raster scanned either along certain lines, or columns, or fully in parallel, and either optically, magnetically, galvanically or electrically. For evaluating a raster element or point, the area surrounding the point is taken into consideration. It is one object of the present invention to avoid the aforementioned disadvantages of conventional methods and arrangements.

According to the invention there are provided one or more threshold circuits (grey-value thresholds) which, in accordance with the existing reflected light intensity (grey-value) of a sampled point in an $(n \times m)$-field of raster points ($n$=columns, $m$=lines) which has just been scanned, are adapted to deliver digital signals representative of a quantized blackness or intensity value corresponding to the scanned point. Moreover, the digital signals are each applied to a shift register having an array of stages resembling the scanning raster in spatial distribution in synchronism with the pointwise raster scan, and thereby shifted through the shift register in synchronism with the point raster scan, so that all digits corresponding to a character element pass once through corresponding predetermined stages in the respective registers representing the mean stage of a special group of stages including several stages containing signals representing the values of scanned points in the surface extension $(n_1 \times m_1)$ adjacent the point whose value is stored in the predetermined stage of the shift register. This group of stages is connected to a translator circuit which, in dependency upon the signals representing the values of neighbouring elements of the preferential stages of the shift registers, and in dependency upon the intensities represented by the signals in the neighbouring stages and in predetermined stage, decides whether the sampled element is, or is not part of the line pattern of a character. If the element does belong to the character line pattern, this information is stored, in a shift register following the translator circuit, as a binary bit signal representing black information, and a signal representing a white information bit is stored if the character does not belong to the line pattern. The reduced character signal combination finally contained in the shift register following the translator circuit is then evaluated in a conventional character recognition circuit.

One advantageous further aspect of the present arrangement is that the threshold circuits set to distinguish different signal levels, and that the outputs of the threshold circuits are coupled to a translator which is so designed that the threshold outputs are converted into binary signals in a code representation comprising a sufficient number of bits to represent all possible input information conditions to a desired degree of resolution.

A further aspect of the invention is characterised by the fact that the number of shift register stages is reduced to $n_1 \times m$ where $m$ is less than $n_1$.

Other features of the subject matter of the invention may be understood from the following description and the remaining sub-claims.

With respect to the conventional methods and arrangements for automatic character recognition, the present invention provides an advantage in that increased recognition accuracy is obtainable with relatively slight increase in the cost of logical recognition circuits, because in the second shift register storage device, to which the character recognition circuit is coupled, there is stored an ideally reduced configuration of binary signals representing the scanned character.

Figure 1B:
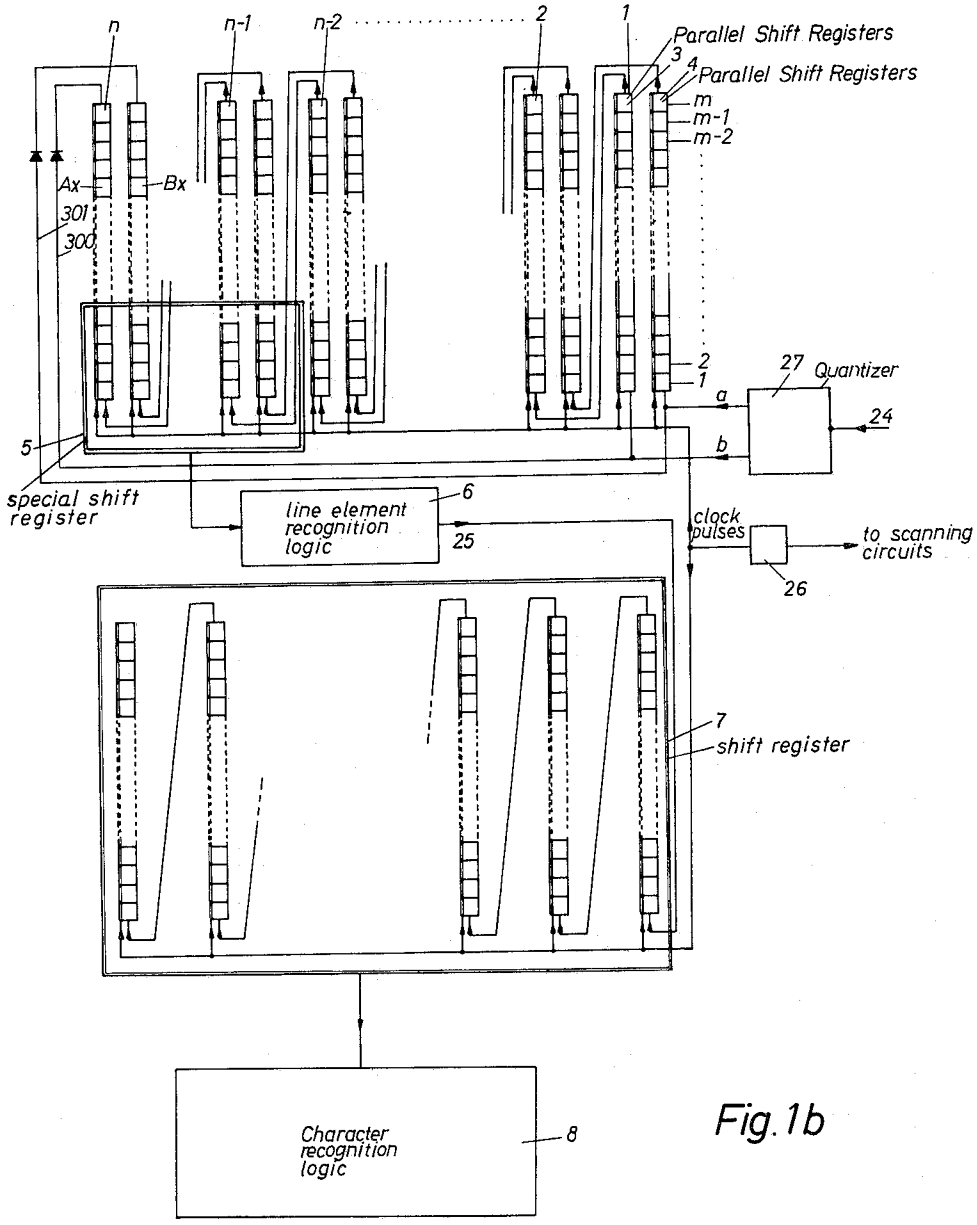
Figure 5:
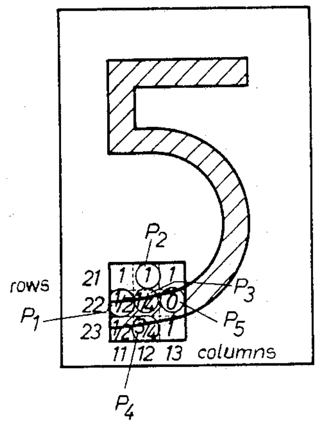
Figure 6:
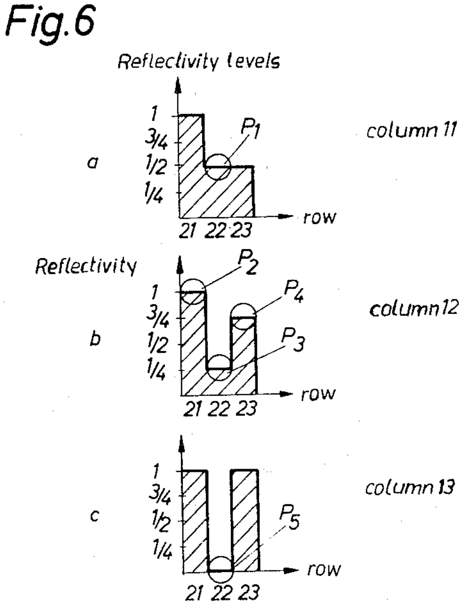

In the following the invention is explained in detail with reference to exemplary FIGS. 1–8 of the accompanying drawings, in which:

FIG. 1*a* is a general view of an arrangement according to the invention,

FIG. 1*b* is an arrangement according to the invention using a translator (converter), FIGS. 2*a*–2*d* illustrate the effect on a character representation of the shifting operations within the shift register controlled by clock-pulses, FIG. 3 shows the basic circuit diagram of the translator 27 in FIG. 1*b*, FIG. 4 is a table of values of possible output signals of the translator according to FIG. 3, FIG. 5 shows a 3 x 3 matrix of shift-register stages for recognizing line elements, FIG. 6 is a representation of the quantized grey-value distribution in the 3 x 3 matrix of FIG. 5, FIG. 7 is a schematic representation of the special area 5 shown in FIG. 1, and FIGS. 8*a*–8*c* are schematic drawings of a line element recognition circuit arrangement illustrating the electrical output conditions for various exemplary input conditions.

Even if the scanned raster points are most carefully selected, the scanning of erroneous intelligence due to disturbed individual points can not be avoided. The fact that the course of the line pattern of a character can be determined by scanning limited sections of the character, event if a character, such as the letter "ö," is composed of three parts, is analyzed by means of the present invention. In the course of the optical scanning process, on which the following discussions are based, it is possible, by sensing several different values of light reflection intensity (grey stages), to carry out the conversion of fuzzy grey points in a character into binary-valued signal elements so that the character is converted into a high-contrast black-and-white image of the scanned line patterns. Fundamentally, it is possible to do so without any particular knowledge of the character itself, if a decision is made with respect to each individual point, in dependency upon a set of neighbouring points, as to whether the individual point is part of a line pattern. If it is decided that a point does form part of a line pattern, this information is stored as a black condition in a second storage device, but if the point under consideration is not part of a line pattern, a white condition is stored in the second storage device. In this way, the second storage device to which the character recognizing circuit is connected, contains signal conditions which represent an idealized black and white character. The block diagram of such a circuit arrangement is shown in FIG. 1*b*. The grey-value information of the scanned character is sampled and then fed to a translator (converter) which is adapted to convert the sampled analog voltage corresponding to the grey value of a scanned point of a character into a corresponding set of binary coded digital signals. To each value of the binary code there are assigned binary output signals *a*, *b* which are respectively connected to input stages of shift registers 3, 4. The number of such parallel-connected shift registers 3, 4 is dependent upon the number of discrete levels which are to be encoded. In the case of the above mentioned two shift registers 3, 4 it is possible to retain $2\times2=4$ values per point of the character, i.e., the remission values can be subdivided into four levels. In order to obtain a finer division the number of shift registers must be increased accordingly.

Figure 2:
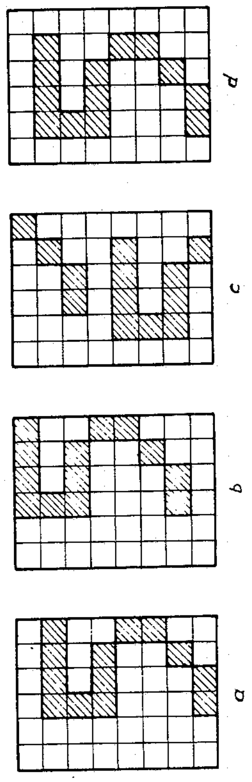

The shifting of a quantized character through shift registers 3, 4 by clock pulses is explained with reference to FIG. 2. FIG. 2*a* is assumed to represent the original arrangement of stored points representing the character "5" in a shift register comprising 6 times 8 stages corresponding to a scanning raster of 6 times 8 points. In response to a clock pulse each of the 48 information items is shifted ont point upwards. Accordingly, after the first clock impulse the whole figure is moved upwards by one line (FIG. 2*b*). After another four clock impulses the figure will have been shifted upwards by exactly five lines (FIG. 2*c*). In each such shift the information on the top line is transferred to the bottom line of the shift register and staggered one column to the left. After exactly eight impulses, hence when the number of impulses equals the number of rows, the figure is again in the original line, but staggered to the left by one column in the shift register (FIG. 2*d*). Accordingly, the geometry of the character is preserved during a complete 8-pulse shifting operation.

During the displacement of the character in the shift registers 3, 4 in FIGS. 1*a*, 1*b*, each point of the character is transferred once into the centre of a special subset of shift register stages 5 representing a sub-area of a scanned character intended for evaluation. To this shift register area there is connected a logic circuit 6, which is adapted to decide whether a quantized point presently under consideration, does or does not belong to a line pattern. In accordance with the decision made by circuit 6, a binary signal corresponding to the subject point is then stored, as an indication of either a black or white information bit in the lower shift register 7. Since the upper shift registers 3, 4, and the lower shift register 7 operate synchronously, the binary elements of the simplified character will be shifted through the lower shift register 7, while simultaneously the four-level elements of the original character traverse the upper shift registers 3, 4. The final recognition of the idealized black-white equivalent of the scanned character is then effected in a character-recognition circuit 8 of conventional design which is connected to the shift register 7. Such circuits for evaluating patterns of binary signals are well known. For example, one such arrangement is discussed at length in connection with FIGURES 4 and 12 in the co-pending application of K. W. Steinbuch et al., Serial No. 747,689, filed July 10, 1958, now issued as Patent No. 3,069,079.

The translator (converter) 27 shown in FIG. 1*b* is explained in detail with reference to FIG. 3. By this translator the intensity values transferred by the scanning signals, appear as analogue voltage levels at the input 24. The circuits $S_1$, $S_2$, and $S_3$ are threshold circuits which provide a predetermined output variation when the input voltage exceeds a predetermined level. Below the threshold-voltage level they provide constant output voltages representing a binary value of zero and above the threshold-voltage level they provide voltages corresponding to a value of binary 1. The thresholds of $S_1$, $S_2$ and $S_3$ are assumed to be set respectively at ¼, ½, and ¾ of the maximum possible voltage. If, for example, at a given time there exists an intensity value E such that only the output of $S_1$ is a "1"-signal, then AND-circuit 15 is actuated to transfer a "1"-signal because it simultaneously receives a "1"-signal from circuit $S_1$ and a "1"-signal from inverter circuit 14 which inverts the "o"-output of circuit $S_2$. The resultant output signal of AND-circuit 15 is applied via the OR-circuit 16 as a "1"-signal to the output *b*, while the output of OR-circuit 17, which is directly coupled to circuits $S_2$ and $S_3$, remain at "o." The conditions of the outputs *a* and *b* for all possible values of input voltage is shown in FIG. 4.

The signals at outputs *a* and *b* in FIG. 3 are applied to separate shift registers 3, 4 (FIG. 1*b*) which receive and store signals in synchronism with the scanning rhythm. A clock-pulse generator 26, shown in FIGS. 1*a* and 1*b*, supplies uniform groups of impulses for synchronizing all operations of the present circuit arrangement, including the operations required for scanning and for shifting the information in the shift registers 3, 4 and 7 of FIGS. 1*a*, 1*b*. In this way binary encoded signal combinations representing the intensities of scanned points of a character are shifted rhythmically through shift registers 3, 4 and the special area 5 therein to which the line recognition circuit 6 is connected.

To explain the line evaluating operation the area 5 of 3 x 3 shift-register stages, is shown in FIG. 5. This special area includes a stage $P_3$ in which there is stored the value of a point on the lower part of the line pattern of the scanned character "5." In this stage, each of the scanned points is examined in association with the intensity representations in the neighbouring stages $P_1$, $P_2$, $P_4$ and $P_5$ to determine whether it is part of the line pattern of the scanned character. In the present example the preferential area consists of three vertical columns and three horizontal lines. The grey-value (intensity) distribution for the example of FIG. 5 is graphically shown in FIGS. 6*a* through 6*c*. The evaluation as to whether the grey value stored in the mean stage $P_3$ actually belongs to the line pattern and, consequently, as to whether a black information bit should be transferred to the shift register 7 of FIGS. 1*a* and 1*b*, may be carried out in different ways.

For example, the decision may be such that the grey value stored in the mean stage $P_3$ of the preferential area is always stored as a black value into the shift register 7, if the grey value of either stage $P_4$ or of stage $P_5$ is than that of stage $P_3$, and if simultaneously a grey value is stored in stage $P_2$ or in stage $P_1$, and if the amounts in $P_1$ and $P_2$ are not smaller than the amount stored in $P_3$.

One could also conceive of a decision, as to whether or not the respectively regarded partial surface element forms part of the line pattern, made in accordance with other mathematical relationships.

Thus, for example, FIG. 7 shows the preferential portion 5 of the shift register (of FIGS. 1*a*, 1*b*) with 3 x 3 stages. The conditions of associated stages $A_x$, $B_x$ represent the intensity of remission of a corresponding scanned point. The pair of conditions ($A_x$, $B_x$) also represent a binary number.

In the following example the two-digit scanned point values are transferred as a black value single binary digit into the shift register 7, if either the inequalities $C_1$, $C_2$, or the inequalities $D_1$, $D_2$, or all of them, are satisfied.

$$C_1: (A_8, B_8) \leqq (A_5, B_5)$$
$$C_2: (A_5, B_5) > (A_2, B_2)$$
$$D_1: (A_6, B_6) \leqq (A_5, B_5)$$
$$D_2: (A_5, B_5) > (A_4, B_4)$$

The conditions under which $$(A_8, B_8) \leqq (A_5, B_5)$$

are defined by the Boolean expression:

$$[(\overline{A}_8 + A_5) \ \& \ (\overline{B}_8 + B_5)] + [A_5 \ \& \ \overline{A}_8] = 1$$

similarly, the conditions for satisfying the inequality $$(A_5, B_5) > (A_2, B_2)$$

are defined by the equation:

$$[A_5 + \overline{A}_2) \ \& \ (B_5 \ \& \ \overline{B}_2)] + [A_5 \ \& \ \overline{A}_2] = 1$$

where the signs "+" and "&" are to be respectively read as "or" and "and."

The corresponding Boolean equations for the inequalities $D_1$ and $D_2$ are obtained by interchanging the indices.

In this way there is obtained as a rule of translation:

$$\begin{aligned} Z = [([(\overline{A}_8 + A_5) \ \& \ (\overline{B}_8 \vee B_5)] + [A_5 \ \& \ \overline{A}_8]Q \\ \& \ ([(A_5 + \overline{A}_2) \ \& \ B_5 \ \& \ \overline{B}_2] + A_5 \ \& \ \overline{A}_2])] \\ + [([\overline{A}_6 + A_5) \ \& \ (\overline{B}_6 \vee B_5)] + [A_5 \ \& \ \overline{A}_6]) \\ \& \ ([(A_5 + \overline{A}_4) \ \& \ B_5 \ \& \ \overline{B}_4] + [A_5 \ \& \ \overline{A}_5])] \end{aligned}$$

Figure 8A:
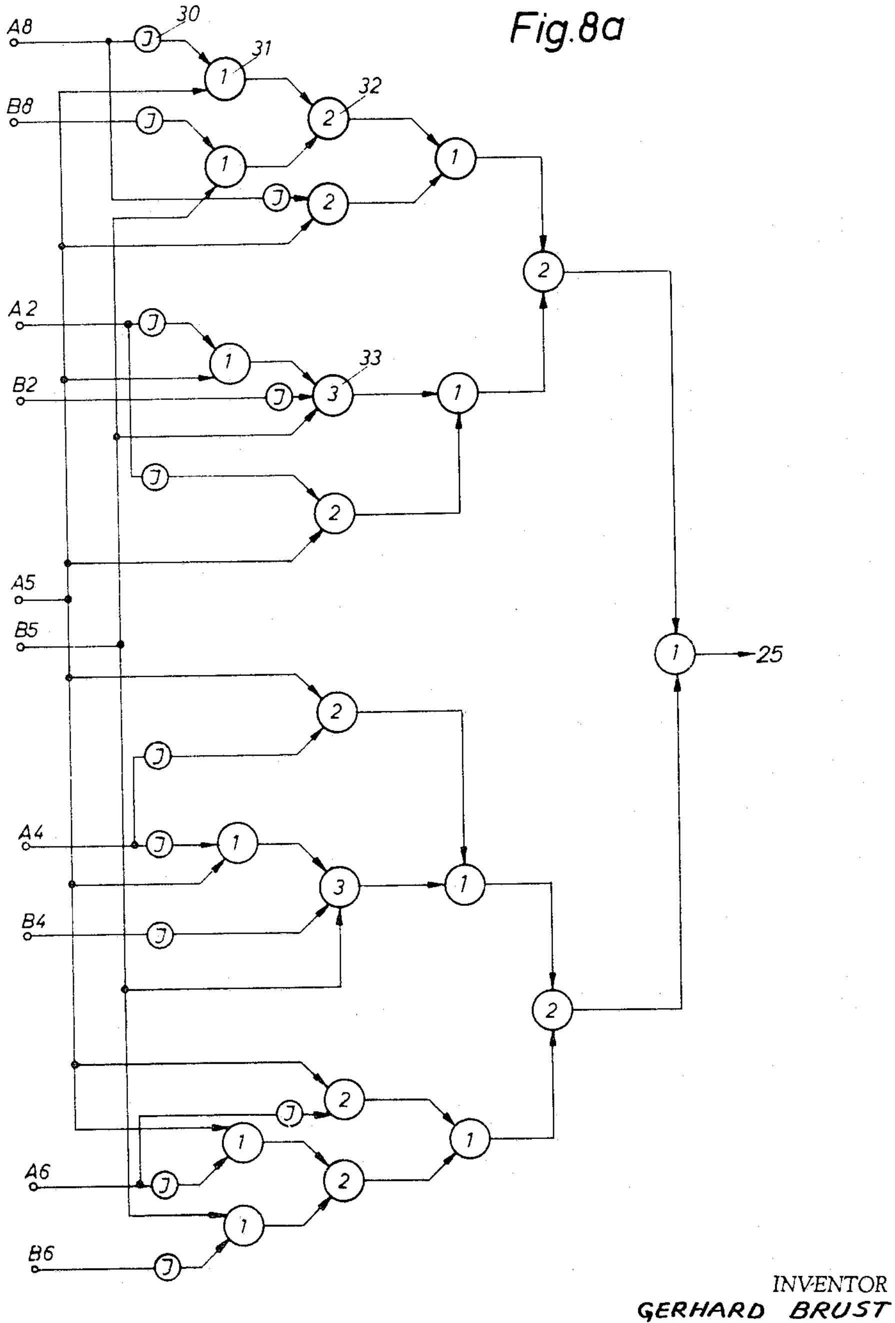

A circuit arrangement satisfying the above rule of translation is shown by way of example in FIG. 8*a*. For explaining this circuit arrangement reference is again made to FIG. 7. As previously mentioned, FIG. 7 shows in detail the special portion 5 in the shift register of FIGS. 1*a*, 1*b*, to which there is connected the line pattern recognition circuit 6. With respect to the stage $A_5$, $B_5$ it is decided, in dependency upon the neighbouring stages $A_2$, $B_2$; $A_4$, $B_4$; $A_6$, $B_6$ and $A_8$, $B_8$, whether the partial surface element of a scanned character stored in stage $A_5$, $B_5$, forms part of the line pattern or not. The outputs of these stages are connected to correspondingly designated inputs of the circuit arrangement according to FIG. 8*a*. This circuit arrangement substantially consists of four different basic circuits which are combined in an appropriate way. The basic circuit designated by the reference numeral 30, represents an inverter delivering at its output the inversion of the signal applied to its input, in other words, when a "0"-signal is applied to its input, a "1"-signal is delivered at its output. A further basic circuit 31 is an OR-circuit, hence a circuit arrangement which delivers a "1"-signal if a "1"-signal is applied to at least one of the inputs. The AND-circuit 32, however, delivers a "1"-signal at its output only if "1"-signals are applied simultaneously to both inputs. Finally, another basic circuit 33 is employed which likewise represents an AND-circuit, but which only delivers a "1"-signal at its output if a "1"-signal simultaneously exists at the three inputs thereof.

The mode of operation of the circuit arrangement in FIG. 8*a* is explained with reference to a specific example wherein values are assumed which satisfy the inequalities $C_1$; $C_2$. These values are supposed to be $$C_1: (A_8, B_8) = 10$$
$$(A_5, B_5) = 11$$
$$C_2: (A_5, B_5) = 11$$
$$(A_2, B_2) = 01$$

Figure 8B:
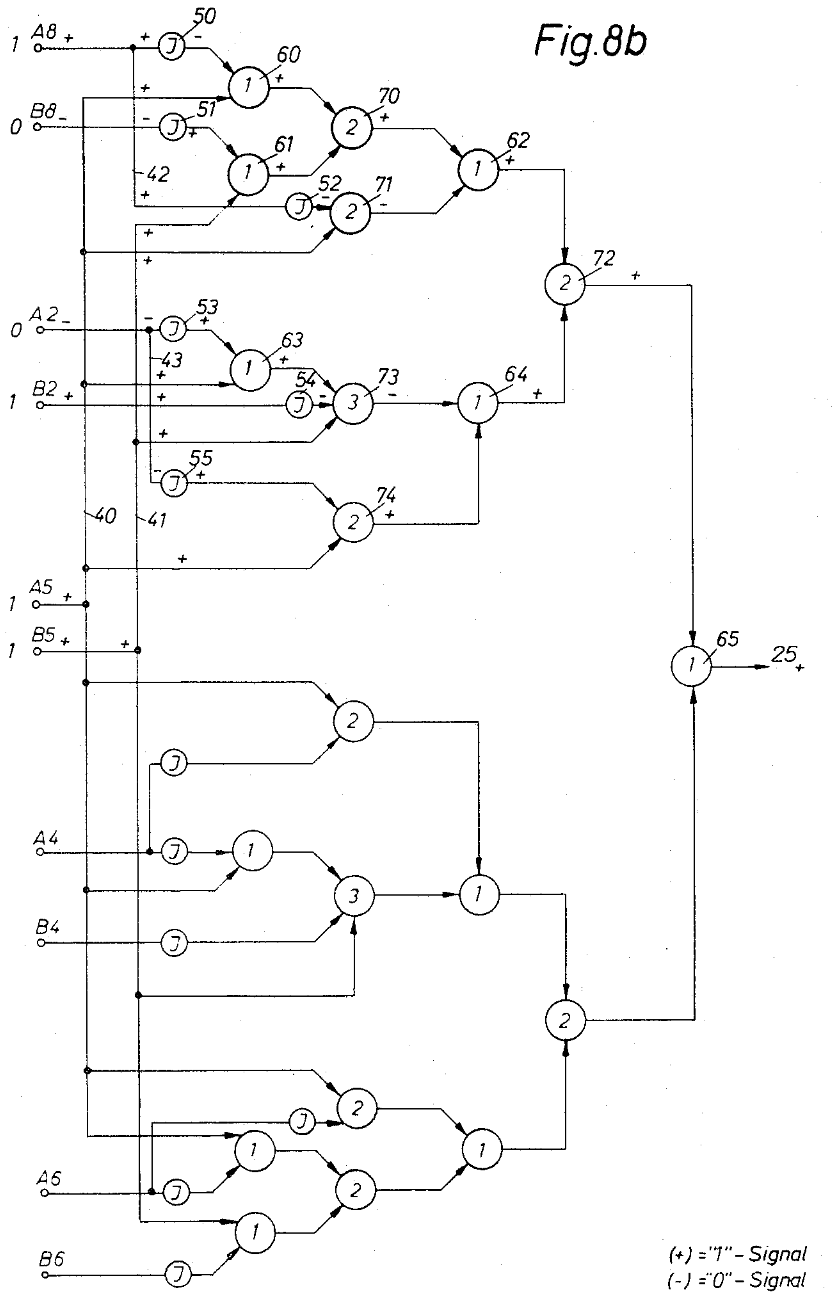

These values and the resultant outputs are shown in FIG. 8*b*, wherein it is noted that a "1"-signal is indicated by a plus (+) sign, and a "0"-signal by a minus (−) sign. Under this condition there will result the signal relationships shown in FIG. 8*b*. To the input $A_8$ and the inverter circuit 50 there is applied a "1"-signal, which appears as a "0"-signal at the output of the inverter circuit. At the same time, via the line 40, a "1"-signal from the input $A_5$ is transferred through the OR-circuit 60, to the AND-circuit 70. The AND-condition for AND-circuit 70 is thus partly satisfied. A "0"-signal is also applied to the input $B_8$, which is inverted in the subsequently arranged inverter circuit 51 into a "1"-signal, which is transferred through OR-circuit 61 to the second input of the AND-circuit 70, so that the "1"-condition for the AND-circuit is fully satisfied, and a "1"-signal is therefore transferred through OR-circuit 62 to AND-circuit 72. This "1"-signal therefore partially enables AND-circuit 72. The other criterion for satisfying the condition of AND-circuit 72 is obtained as follows: To the input $A_5$ there is applied a "1"-signal, which is then fed to one input of the AND-circuit 74. The other "1"-signal which is required for reversing the output of AND-circuit 74, is coupled from input $A_2$, from which a "0"-signal is applied, via the inverter stage 55 to AND-circuit 74. The output of AND-circuit 74 is connected, via the OR-circuit 64, to the AND-circuit 72 which, as both inputs are "1"-signals, transfers a "1"-signal at the output. This "1"-signal is applied via the OR-circuit 65 to the output 25, independently of the condition of the other input. On account of this a binary condition representing a black information bit is stored in the shift register 7, indicating that the information value contained in stage $A_5$, $B_5$ represents part of a line pattern of the scanned character.

If the conditions of the inequalities are not satisfied, a partial surface element which does not form part of a line pattern of a scanned character, is stored in the stage $A_5$, $B_5$. This applies to the following exemplary values.

| | |
|---|---|
| $C_1: (A_8, B_8) = 10$ | $D_1: (A_6, B_6) = 10$ |
| $(A_5, B_5) = 10$ | $(A_5 B_5) = 11$ |
| $C_2: (A_5, B_5) = 10$ | $D_2: (A_5, B_5) = 10$ |
| $(A_2, B_2) = 11$ | $(A_4, B_4) = 11$ |

Figure 8C:
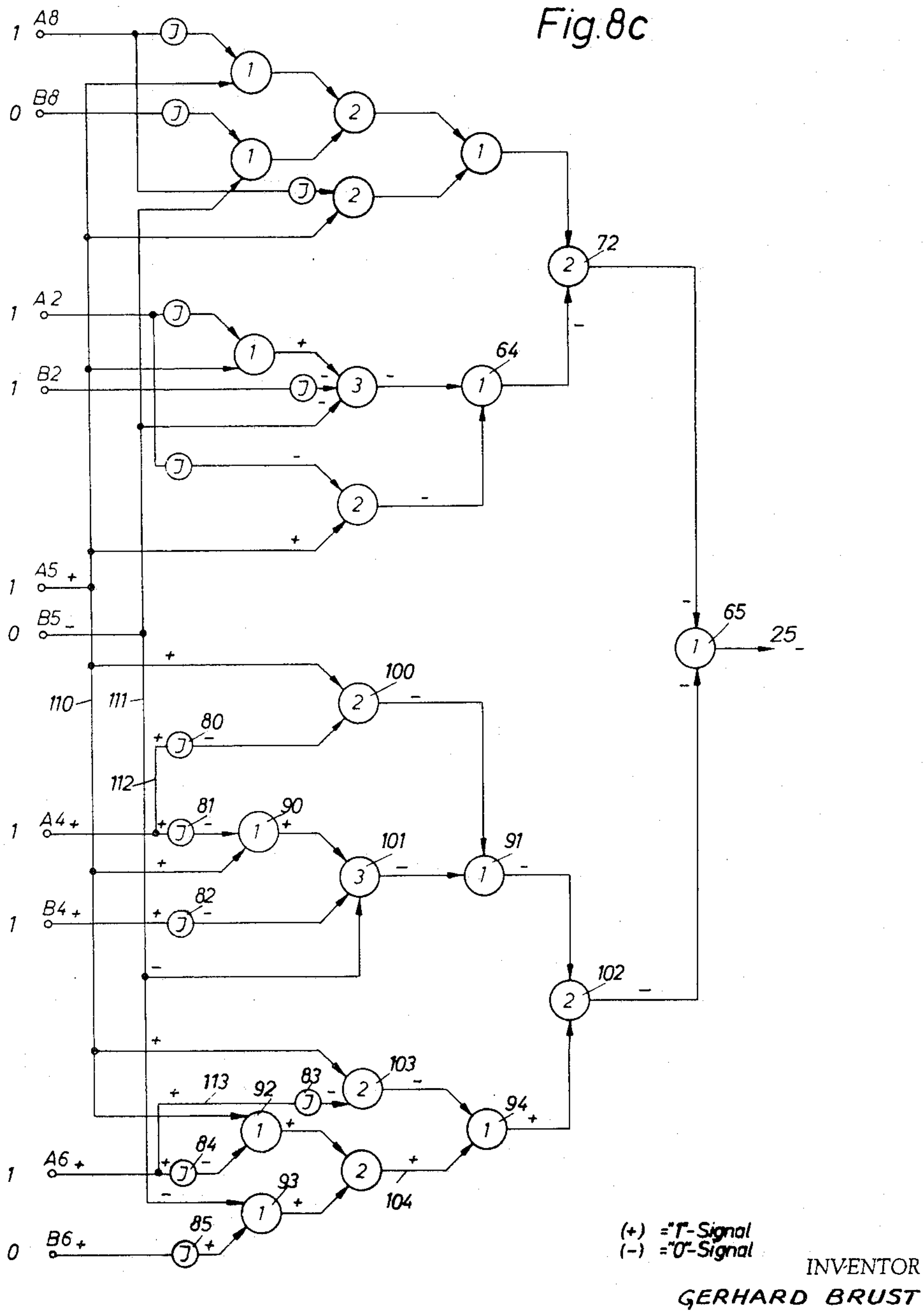

The associated signal relationships are indicated in FIG. 8*c*. The discussion may start out from the fact that a "1"-signal appears at the output 25 of the OR-circuit 65 only if the AND input condition of AND-circuit 102 or 72 is satisfied. Since a "1"-signal exists at the input $A_5$, and a "1"-signal is applied to the input $A_4$, which signal is applied in an inverted fashion to the AND-circuit 100, the condition for AND-circuit 100 is not satisfied. A "0"-signal from input $B_5$ is applied via line 111 to one input of the AND-circuit 101, so that the AND condition thereof is not satisfied. The AND-circuit 102 therefore does not produce a "1"-signal at output 25. The AND-circuit 72, as shown in FIG. 8*c*, is also prevented from delivering a "1"-signal to the output 25 on account of the "0"-signal at the output of OR-circuit 64. Thus, with respect to the partial surface element of the scanned character presently under consideration, and for the present inequalities $C_1$; $C_2$ and $D_1$; $D_2$, a white information bit is stored in the shift register 7.

Thus, at the end of the scanning process, an idealized black-white representation of the scanned character is finally contained in the shift register 7.

It is possible to carry out a comparison check between the ideal character contained in the shift register and the originally stored character in the shift registers 3, 4 (recirculation). This is indicated in FIGS. 1*a*, 1*b* wherein the last stages of the shift registers 3, 4 are connected via decoupled lines 300, 301, to the first stages of the shift register. Thus, as the idealized character enters the shift register 7, the character originally contained in the shift registers 3, 4 reenters the shift register, so that now both the original character and the idealized character are stored simultaneously. These two stored characters may then be compared by means of suitable apparatus, and probable errors can be recognized:

What is claimed is:

1. In legible character recognition apparatus, a circuit arrangement for accurately converting point intensity signals ranging in amplitude over a multiplicity of discrete intensity levels into binary valued signals representative solely of high and low intensity levels and evaluating the resulting pattern of signals comprising: means for conveying signals the amplitudes of which are representative of the intensity of light emanating from successive points in a scanned character image field, said signals ranging in amplitude over a multiplicity of discrete amplitude levels corresponding to a multiplicity of discrete levels of shading at the associated points of said image field, means coupled to said signal conveying means for quantizing said signals according to the particular one of said discrete levels to which each said signal corresponds, said quantizing means being effective to produce binary digital outputs including a plurality of binary digit signal combinations corresponding to each said quantized signal, means coupled to said quantizing means for storing and shifting said binary digital signal combinations in a predetermined geometric pattern corresponding to the pattern in which said image field is being scanned, first signal evaluating means coupled to a given stage of said storing and shifting means and to a plurality of neighboring stages therein, for evaluating the digital signal stored in said given stage together with the digital signals stored in said neighboring stages, and for producing a single binary valued output signal corresponding to the said digital signal in said given stage, second shifting and storing means coupled to said first signal evaluating means for shifting and storing said single binary valued signals in rhythm with, and in the same geometric pattern as, the signals advancing through said first mentioned shifting and storing means, and second evaluating means coupled to said second shifting and storing means for evaluating the pattern of single binary valued signals stored therein following a complete character scan.

2. A circuit arrangement according to claim 1 wherein said quantizing means includes a plurality of threshold circuits having different associated threshold response levels, and means coupled to said plurality of threshold circuits for producing binary digital signal combinations in accordance with the outputs thereof.

3. A circuit arrangement according to claim 1 wherein said first storing and shifting means includes a separate shift register for each digit place of said binary digital signal combinations produced by said quantizing means, each said shift register having a first input stage coupled to said corresponding quantizing means digit output.

4. A circuit arrangement according to claim 3 wheren said shift registers include a special set of associated stages corresponding to a special area of the scanned image field, and said first signal evaluating means is coupled to said special area of shift register stages for evaluating the condition thereof in accordance with a predetermined logical rule.

5. A circuit arrangement according to claim 4 wherein said first signal evaluating circuit produces binary signals representing discrete black or white intelligence, if the quantized value stored in a preferential stage at the shift register area is not less than the quantized value stored in any immediately adjacent stage.

6. A circuit arrangement according to claim 3 wherein the outputs of the last stages of said plurality of shift registers are coupled back to the inputs of the respective first stages thereof.

References Cited by the Examiner

UNITED STATES PATENTS

| | | | |
|---|---|---|---|
| 2,897,481 | 7/1959 | Shepard | 340—146.3 |
| 2,932,006 | 4/1960 | Glauberman. | |
| 2,959,769 | 11/1960 | Greanias et al. | 340—146.3 |
| 2,978,675 | 4/1961 | Highleyman. | |
| 3,025,495 | 3/1962 | Endres. | |
| 3,069,079 | 12/1962 | Steinbuch et al. | |

OTHER REFERENCES

J. S. Bomba, Proceedings E.J.C.C., pages 218–224, December 1959.

L. A. Kamentsky, Proceedings W.J.C.C., pages 304–309, March 1959.

L. P. Horwitz and G. L. Shelton, Jr., "Pattern Recognition Processing Technique," IBM Tech. Disc. Bull., vol. 5, No. 5, October 1962.

MALCOLM A. MORRISON, *Primary Examiner.*